United States Patent
Choi et al.

(10) Patent No.: US 12,512,456 B2
(45) Date of Patent: Dec. 30, 2025

(54) METHOD OF PREPARING POSITIVE ELECTRODE MATERIAL FOR LITHIUM SECONDARY BATTERY AND POSITIVE ELECTRODE MATERIAL FOR LITHIUM SECONDARY BATTERY PREPARED THEREBY

(71) Applicant: LG Chem, Ltd., Seoul (KR)

(72) Inventors: Sang Soon Choi, Daejeon (KR); Hwa Seok Chae, Daejeon (KR); Jae Geun Kim, Daejeon (KR); Seong Hoon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1038 days.

(21) Appl. No.: 17/252,805

(22) PCT Filed: Sep. 11, 2019

(86) PCT No.: PCT/KR2019/011886
§ 371 (c)(1),
(2) Date: Dec. 16, 2020

(87) PCT Pub. No.: WO2020/055198
PCT Pub. Date: Mar. 19, 2020

(65) Prior Publication Data
US 2021/0265615 A1    Aug. 26, 2021

(30) Foreign Application Priority Data

Sep. 14, 2018    (KR) .................. 10-2018-0110158

(51) Int. Cl.
*H01M 4/04*    (2006.01)
*H01M 4/02*    (2006.01)
*H01M 4/505*    (2010.01)
*H01M 4/525*    (2010.01)
*H01M 10/0525*    (2010.01)

(52) U.S. Cl.
CPC ......... *H01M 4/0471* (2013.01); *H01M 4/505* (2013.01); *H01M 4/525* (2013.01); *H01M 10/0525* (2013.01); *H01M 2004/028* (2013.01); *H01M 2220/20* (2013.01)

(58) Field of Classification Search
CPC .............................. H01M 4/0471; H01M 4/525
See application file for complete search history.

(56) References Cited

U.S. PATENT DOCUMENTS

| | | | |
|---|---|---|---|
| 2005/0271576 A1 | 12/2005 | Awano et al. | |
| 2009/0146115 A1* | 6/2009 | Xiao | H01M 4/0471 252/519.15 |
| 2009/0212267 A1 | 8/2009 | Dobbs et al. | |
| 2013/0273429 A1 | 10/2013 | Yu | |
| 2013/0302685 A1 | 11/2013 | Kim et al. | |
| 2014/0038052 A1 | 2/2014 | Song et al. | |
| 2014/0227599 A1 | 8/2014 | Nishide et al. | |
| 2014/0356718 A1 | 12/2014 | Ito et al. | |
| 2015/0340686 A1 | 11/2015 | Sun et al. | |
| 2018/0090782 A1 | 3/2018 | Choi et al. | |
| 2018/0145322 A1* | 5/2018 | Choi | H01M 4/366 |
| 2018/0166687 A1* | 6/2018 | Chang | H01M 4/505 |
| 2018/0241036 A1 | 8/2018 | Jo et al. | |
| 2018/0301748 A1* | 10/2018 | Fujihara | H01M 4/525 |
| 2018/0316006 A1 | 11/2018 | Kaneda et al. | |
| 2019/0372110 A1 | 12/2019 | Nam et al. | |
| 2020/0052295 A1 | 2/2020 | Koshika et al. | |
| 2021/0167365 A1 | 6/2021 | Kim et al. | |
| 2021/0376317 A1* | 12/2021 | Min | H01M 10/0525 |

FOREIGN PATENT DOCUMENTS

| | | |
|---|---|---|
| CN | 107949938 A | 4/2018 |
| CN | 111989805 A | 11/2020 |
| EP | 3647270 A1 | 5/2020 |
| EP | 3764438 A1 | 1/2021 |
| JP | 4374930 B2 | 12/2009 |
| JP | 2011508378 A | 3/2011 |
| JP | 2013179044 A | 9/2013 |

(Continued)

OTHER PUBLICATIONS

Xu et al. "Influence of precursor phase on the structure and electrochemical properties of Li (NiO. 6Mn0. 2Co0. 2) O2 cathode materials." Solid State Ionics 324 (2018): 49-58. (Year: 2018).*
International Search Report for Application No. PCT/KR2019/011886, mailed Dec. 24, 2019, pp. 1-2.
Extended European Search for Application No. 19859894.8 dated Jun. 25, 2021. 9 pgs.
Search Report dated Jun. 17, 2022 from Office Action for Chinese Application No. 201980039841.4 issued Jun. 24, 2022. 3 pgs.

*Primary Examiner* — Allison Bourke
*Assistant Examiner* — Kayla Elaine Clary
(74) *Attorney, Agent, or Firm* — Lerner David LLP

(57) ABSTRACT

A method of preparing a positive electrode material is provided. The method includes mixing a first positive electrode active material precursor having an average particle diameter ($D_{50}$) of 10 μm to 30 μm with a lithium-containing raw material and pre-sintering the mixture to obtain a first pre-sintered product, mixing a second positive electrode active material precursor having an average particle diameter ($D_{50}$) different from that of the first positive electrode active material precursor with a lithium-containing raw material and pre-sintering the mixture to obtain a second pre-sintered product, disintegrating each of the first pre-sintered product and the second pre-sintered product, and mixing the disintegrated first pre-sintered product and the disintegrated second pre-sintered product and main-sintering the mixture to obtain a positive electrode material.

6 Claims, No Drawings

(56) References Cited

FOREIGN PATENT DOCUMENTS

| | | |
|---|---|---|
| JP | 2018070419 A | 5/2018 |
| KR | 101614991 B1 | 4/2016 |
| KR | 101718057 B1 | 3/2017 |
| KR | 101840541 B1 | 3/2018 |
| KR | 20180059753 A | 6/2018 |
| KR | 20180064295 A | 6/2018 |
| KR | 20180066623 A | 6/2018 |
| WO | 2013038918 A1 | 3/2013 |
| WO | 2017057078 A1 | 4/2017 |
| WO | 2017095081 A1 | 6/2017 |
| WO | WO-2019124943 A1 * | 6/2019 ............. C01G 53/00 |

* cited by examiner

METHOD OF PREPARING POSITIVE ELECTRODE MATERIAL FOR LITHIUM SECONDARY BATTERY AND POSITIVE ELECTRODE MATERIAL FOR LITHIUM SECONDARY BATTERY PREPARED THEREBY

CROSS-REFERENCE TO RELATED APPLICATIONS

The present application is a national phase entry under 35 U.S.C. § 371 of International Application No. PCT/KR2019/011886, filed on Sep. 11, 2019, which claims priority to Korean Patent Application No. 10-2018-0110158, filed on Sep. 14, 2018, in the Korean Intellectual Property Office, the disclosures of which are incorporated herein in their entirety by reference.

Technical Field

The present invention relates to a method of preparing a positive electrode material for a lithium secondary battery, a positive electrode material for a lithium secondary battery prepared by the method of preparing a positive electrode material, a positive electrode for a lithium secondary battery including the positive electrode material, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal oxides have been used as a positive electrode active material of the lithium secondary battery, and, among these oxides, a lithium cobalt oxide, such as $LiCoO_2$, having a high operating voltage and excellent capacity characteristics has been mainly used. However, since the $LiCoO_2$ has very poor thermal properties due to an unstable crystal structure caused by delithiation and is expensive, there is a limitation in using a large amount of the $LiCoO_2$ as a power source for applications such as electric vehicles.

Lithium manganese composite metal oxides ($LiMnO_2$ or $LiMn_2O_4$, etc.), lithium iron phosphate compounds (LiFePO4, etc.), or lithium nickel composite metal oxides ($LiNiO_2$, etc.) have been developed as materials for replacing the $LiCoO_2$.

Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, $LiNi_{1-\alpha}Co_\alpha O_2$ ($\alpha$=0.1 to 0.3), in which a portion of nickel is substituted with cobalt, or a lithium nickel cobalt metal oxide, in which a portion of nickel is substituted with manganese (Mn), cobalt (Co), or aluminum (Al), has been developed.

However, with respect to the lithium nickel cobalt metal oxide, there is a limitation in that capacity is low. In order to increase the capacity of the lithium nickel cobalt metal oxide, a method of increasing an amount of nickel or increasing packing density per unit volume of the positive electrode active material has been studied.

In a case in which the amount of the nickel in the lithium nickel cobalt metal oxide is increased, there is a limitation in that a large amount of lithium by-products, such as LiOH and $Li_2CO_3$, is generated on a surface thereof due to the tendency for the nickel in the lithium nickel cobalt metal oxide to remain as $Ni^{2+}$. Thus, in a case in which the lithium nickel cobalt metal oxide having a large amount of lithium on the surface thereof is used, since the by-products and an electrolyte solution injected into the lithium secondary battery may overreact to cause a swelling phenomenon in the lithium secondary battery, the secondary battery including the lithium nickel cobalt metal oxide may not sufficiently exhibit battery performance.

Also, in a case in which the positive electrode active material is rolled to prepare an electrode having high energy density by increasing the packing density, since the positive electrode active material is damaged, life characteristics of the battery may be significantly degraded.

Therefore, there is a need to develop a positive electrode material which may suppress the occurrence of the swelling phenomenon and may exhibit excellent electrochemical properties when used in a battery by providing the positive electrode material having high capacity.

DISCLOSURE OF THE INVENTION

Technical Problem

An aspect of the present invention provides a method of preparing a positive electrode material having high packing density per unit volume and excellent sintering uniformity by adjusting an equivalence ratio with respect to a lithium compound according to an average particle diameter ($D_{50}$) of a precursor during the preparation of the positive electrode material which includes two kinds of positive electrode active materials having different average particle diameters ($D_{50}$).

Another aspect of the present invention provides a positive electrode material in which the two kinds of positive electrode active materials having different average particle diameters ($D_{50}$) are included, but an optimum equivalence ratio of the lithium compound is used according to the average particle diameter ($D_{50}$).

Another aspect of the present invention provides a positive electrode for a lithium secondary battery which includes the positive electrode material.

Another aspect of the present invention provides a lithium secondary battery in which capacity and resistance characteristics are improved by including the positive electrode.

Technical Solution

According to an aspect of the present invention, there is provided a method of preparing a positive electrode material which includes: mixing a first positive electrode active material precursor having an average particle diameter ($D_{50}$) of 10 μm to 30 μm with a lithium-containing raw material and pre-sintering the mixture to obtain a first pre-sintered product; mixing a second positive electrode active material precursor having an average particle diameter ($D_{50}$) different from that of the first positive electrode active material precursor with a lithium-containing raw material and pre-sintering the mixture to obtain a second pre-sintered product; disintegrating each of the first pre-sintered product and the second pre-sintered product; and mixing the disintegrated first pre-sintered product and the disintegrated second pre-sintered product and main-sintering the mixture to obtain a positive electrode material.

According to another aspect of the present invention, there is provided a positive electrode material including a first positive electrode active material having an average particle diameter ($D_{50}$) of 10 μm to 30 μm; and a second positive electrode active material having a smaller average particle diameter than the first positive electrode active material, wherein an equivalent weight of lithium in the first positive electrode active material and an equivalent weight of lithium in the second positive electrode active material are different.

According to another aspect of the present invention, there is provided a positive electrode for a lithium secondary battery which includes the positive electrode material according to the present invention.

According to another aspect of the present invention, there is provided a lithium secondary battery including the positive electrode according to the present invention.

Advantageous Effects

According to the present invention, since a first positive electrode active material having a large particle diameter, in which an average particle diameter ($D_{50}$) is 10 μm or more, and a second positive electrode active material having a small particle diameter, in which an average particle diameter ($D_{50}$) is 7 μm or less, are mixed and used, a space between first positive electrode active material particles is filled with second positive electrode active material particles to improve packing density per unit volume, and thus, a positive electrode material having improved productivity and capacity may be provided.

In addition, during the preparation of the positive electrode material, since pre-sintering is performed by adjusting an equivalence ratio between a positive electrode active material precursor and a lithium compound according to an average particle diameter ($D_{50}$) of the positive electrode active material precursor and main sintering is performed after the two kinds of positive electrode active materials having different average particle diameters ($D_{50}$) are mixed, both the first positive electrode active material having a large particle diameter and the second positive electrode active material having a small particle diameter may exhibit sintering uniformity.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

Method of Preparing Positive Electrode Active Material

In general, when a lithium transition metal oxide including a large amount of nickel is prepared to improve capacity of a positive electrode for a secondary battery, there is a limitation in that a large amount of lithium by-products is generated on a surface thereof. In order to address the limitation, the lithium by-products present on the surface of the lithium transition metal oxide may be removed by performing a washing process.

However, in a case in which the lithium transition metal oxide is only composed of small particles having an average particle diameter of 7 μm or less, since the lithium transition metal oxide having a small particle diameter may also be filtered during filtration, yield of a positive electrode active material is reduced and filtration time is increased during the filtration, and thus, the lithium by-products may be excessively removed to degrade electrochemical properties (capacity and life characteristics) of a positive electrode material. Also, since a moisture evaporation rate is low during drying, there is also a case where the lithium by-products are regenerated during the drying process. Furthermore, in a case in which the lithium transition metal oxide is only composed of small particles having an average particle diameter of 7 μm or less or the lithium transition metal oxide is only composed of large particles having an average particle diameter of 10 μm or more, since packing density per unit volume is low, there is a limitation in improving productivity when the lithium transition metal oxide is subdivided into crucibles with a predetermined volume.

Thus, since the lithium transition metal oxide composed of small particles having an average particle diameter of 7 μm or less and the lithium transition metal oxide composed of large particles having an average particle diameter of 10 μm or more are mixed and used, the removal of the lithium by-products is easy, and a positive electrode material having excellent packing density per unit volume may be prepared.

However, in a case in which the two types of positive electrode active material precursors having different average particle diameters ($D_{50}$) are mixed and the mixture is sintered with a lithium-containing raw material to prepare the above positive electrode material, since a specific surface area varies depending on the diameter of the positive electrode active material precursor, reactivity with the lithium-containing raw material varies so that the positive electrode active material of large particle diameter having a relatively larger average particle diameter ($D_{50}$) may be partially unsintered and the positive electrode active material of small particle diameter having a relatively smaller average particle diameter ($D_{50}$) may be over-sintered. Thus, since sintering uniformity of the positive electrode material is changed, life characteristics and resistance characteristics may be degraded when the positive electrode material is used in a battery.

Accordingly, the present inventors found that, in order to develop a positive electrode material capable of improving capacity characteristics, since two kinds of positive electrode active material precursors having different average particle diameters are used, but two kinds of pre-sintered products, which are subjected to pre-sintering after the positive electrode active material precursors are mixed with a lithium-containing raw material in an equivalence ratio optimized according to the average particle diameter ($D_{50}$) of the positive electrode active material precursor, are mixed and subjected to main sintering, sintering uniformity of the finally prepared positive electrode material is excellent and electrode density is improved to improve life characteristics and resistance characteristics when the positive electrode material is used in a battery, thereby leading to the completion of the present invention.

Hereinafter, a method of preparing a positive electrode active material according to the present invention will be described in detail.

The method of preparing a positive electrode active material according to the present invention includes the steps of: mixing a first positive electrode active material precursor having an average particle diameter ($D_{50}$) of 10 μm to 30 μm with a lithium-containing raw material and pre-sintering the mixture to obtain a first pre-sintered product; mixing a second positive electrode active material precursor having an average particle diameter ($D_{50}$) different from that of the first positive electrode active material precursor with a lithium-containing raw material and pre-sintering the mixture to obtain a second pre-sintered product; disintegrating each of the first pre-sintered product and the second pre-sintered product; and mixing the disintegrated first pre-sintered product and the disintegrated second pre-sintered product and main-sintering the mixture to obtain a positive electrode material.

Hereinafter, each step will be described in more detail.

First, a first positive electrode active material precursor having an average particle diameter ($D_{50}$) of 10 μm to 30 μm and a lithium-containing raw material are mixed and pre-sintered to obtain a first pre-sintered product.

Separately, a second positive electrode active material precursor having an average particle diameter ($D_{50}$) different from that of the first positive electrode active material precursor and a lithium-containing raw material are mixed and pre-sintered to obtain a second pre-sintered product.

For example, the second positive electrode active material precursor has a smaller average particle diameter ($D_{50}$) than the first positive electrode active material precursor, and the second positive electrode active material precursor may preferably have an average particle diameter ($D_{50}$) of 3 μm to 7 μm, for example, 4 μm to 5 μm.

Since the reactivity with the lithium-containing raw material varies depending on the average particle diameters ($D_{50}$) of particles of the first positive electrode active material precursor and the second positive electrode active material precursor, a positive electrode material having excellent sintering uniformity may be subsequently prepared only when a lithium compound is mixed in an equivalence ratio optimized according to the average particle diameter ($D_{50}$).

Specifically, the first positive electrode active material precursor having an average particle diameter ($D_{50}$) of 10 μm to 30 μm and the lithium-containing raw material may be mixed in an equivalence ratio of 1:1.03 to 1.1, for example, 1:1.05 to 1.09.

The second positive electrode active material precursor having an average particle diameter ($D_{50}$) of 3 μm to 7 μm and the lithium-containing raw material may be mixed in an equivalence ratio of 1:1.01 to 1.07, for example, 1:1.01 to 1.05.

The first positive electrode active material precursor and/or the second positive electrode active material precursor may each independently represented by Formula 1 below.

$$Ni_xCo_yM^1_{(1-x-y)}(OH)_2 \quad \text{[Formula 1]}$$

In Formula 1, $0.6 \leq x < 1.0$, $0 < y \leq 0.4$, and $0.6 < x+y \leq 1.0$.

A commercially available product may be purchased and used as a nickel-cobalt-manganese hydroxide represented by Formula 1, or the nickel-cobalt-manganese hydroxide represented by Formula 1 may be prepared according to a method of preparing a nickel-cobalt-manganese hydroxide which is well known in the art.

For example, the nickel-cobalt-manganese hydroxide represented by Formula 1 may be prepared by a co-precipitation reaction by adding an ammonium cation-containing complexing agent and a basic compound to a metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O_4$, $NiSO_4$, $NiSO_4 \cdot 6H_2O$, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include $Co(OH)_2$, $CoOOH$, $Co(OCOCH_3)_2 \cdot 4H_2O$, $Co(NO_3)_2 \cdot 6H_2O$, $Co(SO_4)_2 \cdot 7H_2O$, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The metal solution may be prepared by adding the nickel-containing raw material, the cobalt-containing raw material, and the manganese-containing raw material to a solvent, specifically water, or a mixed solvent of an organic solvent (e.g., alcohol etc.) which may be uniformly mixed with the water, or may be prepared by mixing an aqueous solution of the nickel-containing raw material, an aqueous solution of the cobalt-containing raw material, and the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as $NaOH$, $KOH$, or $Ca(OH)_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent.

The basic compound is added to adjust a pH of a reaction solution, wherein the basic compound may be added in an amount such that the pH of the metal solution is 10.5 to 13, for example, 11 to 13.

The co-precipitation reaction may be performed in a temperature range of 40° C. to 70° C. in an inert atmosphere such as nitrogen or argon.

Particles of the nickel-cobalt-manganese hydroxide are formed by the above-described process, and are precipitated in the reaction solution. The precipitated nickel-cobalt-manganese hydroxide particles may be separated according to a conventional method and dried to prepare a transition metal precursor.

As the lithium raw material, various lithium raw materials known in the art may be used with limitation, and, for example, lithium-containing carbonates (e.g., lithium carbonate, etc.), lithium-containing hydrates (e.g., lithium hydroxide monohydrate ($LiOH \cdot H_2O$), etc.), lithium-containing hydroxides (e.g., lithium hydroxide, etc.), lithium-containing nitrates (e.g., lithium nitrate ($LiNO_3$), etc.), or lithium-containing chlorides (e.g., lithium chloride (LiCl), etc.) may be used. Preferably, at least one selected from the group consisting of lithium hydroxide and lithium carbonate may be used as the lithium raw material.

During the preparation of the first pre-sintered product and the second pre-sintered product, the pre-sintering may each independently be performed in a temperature range of 500° C. to 800° C. for 3 hours to 24 hours, for example, 550° C. to 700° C. for 3 hours to 12 hours.

Since the pre-sintering is performed within the above temperature range, lithium ions from the lithium-containing raw material may diffuse into each of the first positive electrode active material precursor and/or the second positive electrode active material precursor, and, in this case, density per unit volume of the resulting first pre-sintered product or second pre-sintered product may be increased by removing moisture or gas present in each of the first positive electrode active material precursor and/or the second positive electrode active material precursor.

Specifically, the first pre-sintered product and/or the second pre-sintered product, in which a lithium nickel cobalt manganese oxide having a spinel structure and seeds of a lithium nickel cobalt manganese oxide having a layered structure are mixed, are formed while the lithium raw material and each of the first positive electrode active material precursor and/or the second positive electrode active material precursor represented by Formula 1 react by the pre-sintering.

In relation to the foregoing, the following Reaction Formula 1 illustrates a reaction which occurs during the pre-sintering when LiOH is used as the lithium raw material and the nickel manganese cobalt hydroxide represented by Formula 1 is used as the positive electrode active material precursor.

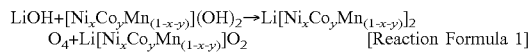   [Reaction Formula 1]

Also, the pre-sintering may be performed in an oxygen atmosphere or air atmosphere. In a case in which the pre-sintering is performed within the above-described temperature range, a lithium nickel cobalt manganese-based oxide having a spinel structure is formed, wherein, since the spinel structure is formed through an oxidation process as illustrated in Reaction Formula 1, a crystal size is increased and a cation mixing value is decreased under a high-oxygen partial pressure condition. Thus, it is desirable that the pre-sintering is performed in an oxygen atmosphere with a high oxygen partial pressure or air atmosphere.

Furthermore, the pre-sintering for obtaining the first pre-sintered product and the pre-sintering for obtaining the second pre-sintered product may be performed at the same temperature, or the pre-sintering for obtaining the first pre-sintered product using the first positive electrode active material precursor having a relatively large average particle diameter may be performed at a temperature higher than, for example, at a temperature 20° C. or more higher than the temperature of the pre-sintering for obtaining the second pre-sintered product.

In addition to the lithium raw material and the precursor represented by Formula 1, the first pre-sintered product and/or the second pre-sintered product may further selectively include a doping element $M^2$-containing raw material for improving physical properties and stability of the active material, if necessary. For example, as the doping element $M^2$-containing raw material, doping element $M^2$ ($M^2$ is at least one selected from the group consisting of tungsten (W), copper (Cu), iron (Fe), vanadium (V), chromium (Cr), titanium (Ti), zirconium (Zr), zinc (Zn), aluminum (Al), Indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo))-containing sulfates, nitrates, acetic acid salts, halides, hydroxides, or oxyhydroxides may be used, and these materials may be used without particular limitation as long as they may be dissolved in the above-described solvent such as water.

Subsequently, each of the first pre-sintered product and the second pre-sintered product is disintegrated.

Specifically, the first pre-sintered product and second pre-sintered product formed by the pre-sintering are disintegrated, respectively.

The disintegration may be performed by using a general disintegration method known in the art, and, for example, may be performed by ball milling, jet milling, or sieving.

For example, a particle agglomeration phenomenon may partially occur in the first pre-sintered product and second pre-sintered product formed by the pre-sintering. Thus, the sintering uniformity may be improved during the subsequent main sintering by disintegrating the agglomerate particles.

Finally, the disintegrated first pre-sintered product and the disintegrated second pre-sintered product are mixed, and main sintering is performed.

The first pre-sintered product subjected to the disintegrating and the disintegrated second pre-sintered product may be mixed in a weight ratio of 0.5 to 0.9:0.5 to 0.1, for example, 0.6 to 0.9:0.4 to 0.1.

Since the second pre-sintered product having a relatively smaller average particle diameter ($D_{50}$) is disposed in a space of the first pre-sintered product having an average particle diameter ($D_{50}$) of 10 μm to 30 μm by mixing the first pre-sintered product and second pre-sintered product subjected to the disintegrating, the packing density per unit volume may be further increased and a more amount of the positive electrode material may be provided by the improvement of the packing density per unit volume even if the sintering is performed in the same sintering furnace.

For example, since the disintegrated first pre-sintered product and the disintegrated second pre-sintered product are mixed and the mixture is sintered at once, cost reduction due to a reduction of process time may be possible in comparison to a case where the first pre-sintered product and the second pre-sintered product are respectively sintered to prepare a first positive electrode active material and a second positive electrode active material and the first positive electrode active material and the second positive electrode active material are then mixed. Also, in the case that the first pre-sintered product and the second pre-sintered product are mixed and the mixture is sintered at once as in the present invention, since the packing density per unit volume may be further increased to increase productivity of the positive electrode material. In addition, since a damage to the positive electrode material during washing may be minimized, electrochemical properties may be improved.

The main sintering may be performed in a temperature range of 700° C. to 950° C. for 3 hours to 24 hours, for example, 730° C. to 900° C. for 5 hours to 12 hours.

The spinel structure present in the first pre-sintered product and the second pre-sintered product may be converted into a layered structure by the main sintering as in Reaction Formula 2 below, and the layer-structured lithium nickel cobalt manganese oxide seed may be one from which a crystal grows.

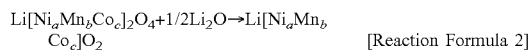

$$Li[Ni_aMn_bCo_c]_2O_4 + 1/2 Li_2O \rightarrow Li[Ni_aMn_bCo_c]O_2 \quad \text{[Reaction Formula 2]}$$

As illustrated in Reaction Formula 2, since a formation process of the layer-structured lithium nickel manganese cobalt oxide is a reduction process, it may be advantageous for the formation of the structure to be carried out under a low-oxygen partial pressure condition.

Specifically, in a case in which the secondary heat treatment is performed under a low-oxygen partial pressure condition, the crystal size may be increased and cation mixing may be reduced. Specifically, the secondary heat treatment by which the layered structure is formed may be performed under a condition in which an oxygen partial pressure is 20% or less, or, more specifically, the secondary heat treatment may be performed in a nitrogen atmosphere, an atmospheric (air) atmosphere, vacuum atmosphere, or atmosphere where nitrogen and air are not supplied, and, accordingly, a positive electrode active material having excellent physical properties and electrochemical properties may be prepared.

After the positive electrode material is obtained by the main sintering, a washing process may be further included.

For example, the washing process may be performed in such a manner that the positive electrode material is mixed in a washing solution (preferably, distilled water) at 10° C. to 40° C., for example, 10° C. to 25° C., and the mixture is then stirred and filtered. The positive electrode material may be washed by adding the washing solution in an amount of 50% to 300%, for example, 50% to 200% based on a weight of the positive electrode material. However, the amount of the washing solution added may not be particularly limited in terms of removing the lithium by-products.

Since the lithium by-products on the surface of the positive electrode material may be dissociated in the washing solution by the washing process, the lithium by-products may be removed from the surface of the positive electrode material.

Positive Electrode Active Material

Also, the present invention provides a positive electrode active material for a lithium secondary battery which is prepared by the above method of preparing a positive electrode active material.

Specifically, the positive electrode active material includes a first positive electrode active material having an average particle diameter ($D_{50}$) of 10 μm to 30 μm; and a second positive electrode active material having a smaller average particle diameter than the first positive electrode active material, wherein an equivalent weight of lithium in the first positive electrode active material and an equivalent weight of lithium in the second positive electrode active material may be different.

Specifically, the first positive electrode active material may be represented by Formula 2 below.

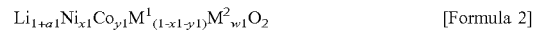

$$Li_{1+a1}Ni_{x1}Co_{y1}M^1_{(1-x1-y1)}M^2_{w1}O_2 \quad \text{[Formula 2]}$$

In Formula 2, $M^1$ includes at least one selected from the group consisting of manganese (Mn) or Al, $M^2$ includes at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $0.002 \leq a1 \leq 0.1$, $0.6 \leq x1 \leq 1.0$, $0 < y1 \leq 0.4$, $0.6 \leq x1+y1 \leq 1.0$, and $0 \leq w1 \leq 0.05$.

The second positive electrode active material may be represented by Formula 3 below.

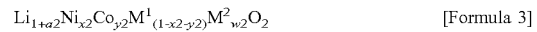

$$Li_{1+a2}Ni_{x2}Co_{y2}M^1_{(1-x2-y2)}M^2_{w2}O_2 \quad \text{[Formula 3]}$$

In Formula 3, $M^1$ includes at least one selected from the group consisting of Mn or Al, $M^2$ includes at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, $0.002 \leq a2 \leq 0.1$, $0.6 \leq x2 \leq 1.0$, $0 < y2 \leq 0.4$, $0.6 \leq x2+y2 \leq 1.0$, and $0 \leq w2 \leq 0.05$.

The second positive electrode active material may have an average particle diameter ($D_{50}$) of 3 μm to 7 μm, for example, 4 μm to 5 μm.

The first positive electrode active material and the second positive electrode active material may be included in a weight ratio of 0.5 to 0.9:0.5 to 0.1, for example, 0.6 to 0.9:0.4 to 0.1. In a case in which the first positive electrode active material and the second positive electrode active material are included in amounts within the above range, the packing density may be maximized and filtration time during the washing process may be reduced. Also, the electrochemical properties (capacity and life characteristics) may be improved. For example, in a case in which the amount of the second positive electrode active material is greater than the above range, the capacity is increased but the life characteristics may be degraded. In contrast, in a case in which the amount of the first positive electrode active material is greater than the above range, the life characteristics is improved, but the capacity may be reduced. Furthermore, in a case in which only the first positive electrode active material is present, since the particles break during electrode rolling, the life characteristics may be degraded in comparison to a case where a positive electrode active material having a small particle diameter is included.

As described above, since the positive electrode material according to the present invention includes nickel in a high amount of 60 mol % or more, preferably 70 mol % or more, and more preferably 80 mol % or more based on a total number of moles of transition metals excluding lithium, the positive electrode material capable of improving capacity characteristics due to the inclusion of the large amount of the nickel may be provided.

In addition, since the two kinds of positive electrode active materials having different average particle diameters ($D_{50}$), specifically, the first positive electrode active material having an average particle diameter ($D_{50}$) of 10 μm to 30 μm and the second positive electrode active material having an average particle diameter ($D_{50}$) of 3 μm to 7 μm are included, the second positive electrode active material having a relatively smaller average particle diameter ($D_{50}$) may be disposed in the space of the first positive electrode active material having a relatively larger average particle diameter ($D_{50}$) to further increase the packing density per unit volume, and the positive electrode material may have a tap density of 2.8 g/cc to 4.0 g/cc, for example, 3.0 g/cc to 3.6 g/cc.

Positive Electrode

Furthermore, the present invention provides a positive electrode for a lithium secondary battery which includes the above positive electrode material. Specifically, the positive electrode for a lithium secondary battery includes a positive electrode collector and a positive electrode material layer formed on the positive electrode collector, wherein the positive electrode material layer includes the positive electrode material according to the present invention.

In this case, since the positive electrode material including the first positive electrode active material and the second positive electrode active material, which is the same as described above, is used as the positive electrode material, a positive electrode having high rolling density is provided.

In this case, since the positive electrode material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The positive electrode material layer may selectively include a binder as well as a conductive agent, if necessary, in addition to the above-described positive electrode material.

In this case, the positive electrode material may be included in an amount of 80 wt % to 99 wt %, for example, 85 wt % to 98.5 wt % based on a total weight of the positive electrode material layer. When the positive electrode material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode material layer.

The binder improves the adhesion between the positive electrode material particles and the adhesion between the positive electrode material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode material layer.

The positive electrode may be prepared according to a typical method of preparing a positive electrode except that the above-described positive electrode material is used. Specifically, a composition for forming a positive electrode material layer, which is prepared by dissolving or dispersing the positive electrode material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode material layer on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery.

Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

LiOH was mixed in 20 kg of $Ni_{0.85}Co_{0.075}Mn_{0.075}(OH)_2$ having an average particle diameter ($D_{50}$) of 16 μm, as a first positive electrode active material precursor, to obtain an equivalent weight of 1.09 (10.29 kg), and the mixture was pre-sintered at 650° C. for 10 hours to prepare a first pre-sintered product.

Subsequently, LiOH was mixed in 20 kg of $Ni_{0.83}Co_{0.08}Mn_{0.09}(OH)_2$ having an average particle diameter ($D_{50}$) of 4 μm, as a second positive electrode active material precursor, to obtain an equivalent weight of 1.05 (9.75 kg), and the mixture was pre-sintered at 650° C. for 10 hours to prepare a second pre-sintered product.

In this case, the first pre-sintered product had a tap density of 2.8 g/cc, and the second pre-sintered product had a tap density of 1.8 g/cc.

The above-prepared first pre-sintered product and second pre-sintered product were disintegrated by being respectively added to an air classified mill (ACM).

Subsequently, after the first pre-sintered product and the second pre-sintered product were mixed in a volume ratio of 8:2, main sintering was performed at 770° C. for 15 hours to prepare a positive electrode material for a secondary battery.

The above-prepared positive electrode material, a carbon black conductive agent, and a polyvinylidene fluoride binder were mixed in a weight ratio of 96.5:1.5:2 in an N-methylpyrrolidone (NMP) solvent to prepare a composition for forming a positive electrode. A 20 μm thick aluminum foil was coated with the composition for forming a positive electrode, dried, and then roll-pressed to prepare a positive electrode.

Li metal was used as a negative electrode.

After the above-prepared positive electrode and negative electrode were stacked with a 20 μm thick separator to prepare an electrode assembly, the electrode assembly was put in a battery case, an electrolyte solution, in which 1 M $LiPF_6$ was dissolved in a mixed solvent in which ethylene carbonate (EC):ethylmethyl carboante (EMC):fluorobenzene (FB) were mixed in a volume ratio of 3:4:3, was injected thereinto to prepare a lithium secondary battery (coin-type half-cell).

Example 2

LiOH was mixed in 20 kg of $Ni_{0.90}Co_{0.05}Mn_{0.05}(OH)_2$ having an average particle diameter ($D_{50}$) of 13 μm, as a first positive electrode active material precursor, to obtain an equivalent weight of 1.05 (9.75 kg), and the mixture was pre-sintered at 600° C. for 10 hours to prepare a first pre-sintered product.

Subsequently, LiOH was mixed in 20 kg of $Ni_{0.90}Co_{0.05}Mn_{0.05}(OH)_2$ having an average particle diameter ($D_{50}$) of 4 μm, as a second positive electrode active material precursor, to obtain an equivalent weight of 1.03 (9.56 kg), and the mixture was pre-sintered at 600° C. for 10 hours to prepare a second pre-sintered product. In this case, the first pre-sintered product had a tap density of 2.7 g/cc, and the second pre-sintered product had a tap density of 1.8 g/cc.

A positive electrode and a lithium secondary battery were prepared in the same manner as in Example 1 except that, after the above-prepared first pre-sintered product and second pre-sintered product were mixed in a volume ratio of 8:2, main sintering was performed at 750° C. for 15 hours, and the resulting sintered product was used as a positive electrode material for a secondary battery.

Comparative Example 1

A positive electrode and a lithium secondary battery were prepared in the same manner as in Example 1 except that, after the first pre-sintered product prepared in Example 1 was disintegrated, main sintering was performed at 770° C. for 15 hours, and the resulting sintered product was used as a positive electrode material for a secondary battery.

Comparative Example 2

A positive electrode and a lithium secondary battery were prepared in the same manner as in Example 1 except that, after the second pre-sintered product prepared in Example 1 was disintegrated, main sintering was performed at 750° C. for 15 hours, and the resulting sintered product was used as a positive electrode material for a secondary battery.

Comparative Example 3

The first pre-sintered product prepared in Example 1 was subjected to main sintering at 770° C. to prepare a first positive electrode active material. The second pre-sintered product prepared in Example 2 was subjected to main sintering at 750° C. to prepare a second positive electrode active material. A positive electrode and a lithium secondary battery were prepared in the same manner as in Example 1 except that the above-prepared first positive electrode active material and second positive electrode active material were mixed in a volume ratio of 8:2, and the mixture was used as a positive electrode material for a secondary battery.

Comparative Example 4

The first pre-sintered product prepared in Example 2 was subjected to main sintering at 750° C. to prepare a first positive electrode active material. The second pre-sintered product prepared in Example 2 was subjected to main sintering at 730° C. to prepare a second positive electrode active material. A positive electrode and a lithium secondary battery were prepared in the same manner as in Example 2 except that the above-prepared first positive electrode active material and second positive electrode active material were mixed in a volume ratio of 8:2, and the mixture was used as a positive electrode material for a secondary battery.

Experimental Example 1: Tap Density of Positive Electrode Material

After 50 g of each of the positive electrode materials obtained in Examples 1 and 2 and Comparative Examples 1 to 4 was charged into a 100 mL container, apparent density of particles, which was obtained by vibrating the container under predetermined conditions, was measured. Specifically, tap density of the positive electrode material was measured using a tap density tester (LINEAR WEIGHING MACHINE STAV-II, J. Engelsmann AG).

TABLE 1

|  | Tap density of positive electrode material (g/cc) |
|---|---|
| Example 1 | 3.2 |
| Example 2 | 3.22 |

TABLE 1-continued

|  | Tap density of positive electrode material (g/cc) |
|---|---|
| Comparative Example 1 | 3.17 |
| Comparative Example 2 | 2.56 |
| Comparative Example 3 | 1.64 |
| Comparative Example 4 | 3.15 |

As illustrated in Table 1, with respect to the positive electrode materials prepared in Examples 1 and 2, it may be confirmed that tap densities were higher than those of the positive electrode materials prepared in Comparative Examples 1 to 4. Accordingly, it may be predicted that a formation rate of the positive electrode material will be further improved even if a reaction vessel with the same capacity is used during the preparation of the positive electrode material.

Experimental Example 2: Confirmation of Capacity Characteristics of Positive Electrode Material Each of the lithium secondary batteries prepared in Examples 1 and 2 and Comparative Examples 1 to 4 was charged at a constant current of 0.2 C to 4.25 V at room temperature (25° C.) and cut-off charged at 0.005 C. Thereafter, each lithium secondary battery was discharged at a constant current of 0.2 C to a voltage of 2.5 V to measure charge capacity and discharge capacity, and the results thereof are presented in Table 2 below.

TABLE 2

|  | Coin-cell capacity | |
|---|---|---|
|  | Charge capacity (mAh/g) | Discharge capacity (mAh/g) |
| Example 1 | 229.2 | 204.2 |
| Example 2 | 242.3 | 220.0 |
| Comparative Example 1 | 227.2 | 202.2 |
| Comparative Example 2 | 220.6 | 200.8 |
| Comparative Example 3 | 225.9 | 201.4 |
| Comparative Example 4 | 241.5 | 218.1 |

As illustrated in Table 2, with respect to the secondary batteries prepared in Examples 1 and 2, since packing densities per unit volume were improved, it may be confirmed that both charge capacities and discharge capacities were improved in comparison to those of the secondary batteries prepared in Comparative Examples 1 and 2.

Also, with respect to each of Comparative Examples 3 and 4 in which the two kinds of positive electrode active materials having different average particle diameters were respectively prepared and then mixed during the preparation of the positive electrode material, charge capacities and discharge capacities were inferior to those of Examples 1 and 2 which were prepared by mixing and sintering the pre-sintered products having the same composition.

Experimental Example 3: Confirmation of Life Characteristics of Lithium Secondary Battery Life characteristics of the lithium secondary batteries respectively prepared in Examples 1 and 2 and Comparative Examples 1 to 4 were measured.

Specifically, each of the lithium secondary batteries prepared in Examples 1 and 2 and Comparative Examples 1 to 4 was charged at a constant current of 0.2 C to 4.25 V at a high temperature (45° C.) and cut-off charged at 0.005 C. Thereafter, each lithium secondary battery was discharged at a constant current of 0.2 C to a voltage of 2.5 V. The charging and discharging behaviors were set as one cycle, and, after this cycle was repeated 30 times, the life characteristics of the lithium secondary batteries according to Examples 1 and 2 and Comparative Examples 1 to 4 were measured, and the results thereof are presented in Table 3 below.

TABLE 3

| | Capacity retention in $30^{th}$ cycle (%) |
|---|---|
| Example 1 | 96 |
| Example 2 | 93.4 |
| Comparative Example 1 | 93.7 |
| Comparative Example 2 | 94.6 |
| Comparative Example 3 | 94.7 |
| Comparative Example 4 | 92.7 |

As illustrated in Table 3, with respect to the secondary battery prepared in Example 1, since the packing density per unit volume was improved, it may be confirmed that capacity retention was improved in comparison to those of the secondary batteries prepared in Comparative Examples 1 and 2.

Also, with respect to each of Comparative Examples 3 and 4 in which the two kinds of positive electrode active materials having different average particle diameters were respectively prepared and then mixed during the preparation of the positive electrode material, it was confirmed that life characteristics were inferior to those of Examples 1 and 2 which were prepared by mixing and sintering the pre-sintered products having the same composition.

Experimental Example 4: Confirmation of Resistance Characteristics of Lithium Secondary Battery Resistance characteristics at 45° C. of each of the lithium secondary batteries prepared in Examples 1 and 2 and Comparative Examples 1 to 4 were confirmed. Specifically, after each of the lithium secondary batteries prepared in Examples 1 and 2 and Comparative Examples 1 to 4 was charged at a constant current of 0.2 C at 45° C., each lithium secondary battery was discharged at a constant current of 0.2 C for 60 seconds to measure a voltage drop for 60 seconds, and resistance at 45° C. was measured by dividing the voltage drop by a current value. A resistance increase rate was calculated as a percentage of the amount of resistance increase relative to the first cycle, and the results thereof are presented in Table 4 below.

TABLE 4

| | Resistance increase rate in the $30^{th}$ cycle (%) |
|---|---|
| Example 1 | 50.3 |
| Example 2 | 126.5 |
| Comparative Example 1 | 82.1 |
| Comparative Example 2 | 74.1 |
| Comparative Example 3 | 82.8 |
| Comparative Example 4 | 151.2 |

As illustrated in Table 4, with respect to the lithium secondary battery prepared in Example 1, since the two kinds of positive electrode materials having different average particle diameters were uniformly sintered, the resistance increase rate was improved.

With respect to Comparative Examples 1 and 2 having the same composition as the positive electrode active material of Example 1, since Comparative Examples 1 and 2 respectively included only the positive electrode material having a large particle diameter and only the positive electrode material having a small particle diameter, it may be confirmed that the resistance increase rates were also low as each of the positive electrode materials was uniformly sintered.

Also, with respect to each of Comparative Examples 3 and 4 in which the two kinds of positive electrode active materials having different average particle diameters were respectively prepared and then mixed during the preparation of the positive electrode active material, it may be confirmed that resistance characteristics were inferior to those of Examples 1 and 2 which were prepared by mixing and sintering the pre-sintered products having the same composition.

The invention claimed is:

1. A method of preparing a positive electrode material, comprising:
    mixing a first positive electrode active material precursor having an average particle diameter ($D_{50}$) of 10 μm to 30 μm with a lithium-containing raw material, and pre-sintering the mixture to obtain a first pre-sintered product;
    mixing a second positive electrode active material precursor having an average particle diameter ($D_{50}$) different from the average particle diameter ($D_{50}$) of the first positive electrode active material precursor with a lithium-containing raw material, and pre-sintering the mixture to obtain a second pre-sintered product;
    disintegrating each of the first pre-sintered product and the second pre-sintered product; and
    mixing the disintegrated first pre-sintered product and the disintegrated second pre-sintered product, and main-sintering the mixture to obtain a positive electrode material,
    wherein the pre-sintering of the mixture to obtain the first pre-sintered product and the pre-sintering of the mixture to obtain the second pre-sintered product are performed in a temperature range of 500° C. to 700° C., and
    wherein the main-sintering is performed at a constant temperature in a range of 730° C. to 950° C.,
    wherein the second positive electrode active material precursor has an average particle diameter ($D_{50}$) of 3 μm to 7 μm,
    wherein the first positive electrode active material precursor and the lithium-containing raw material are mixed in an equivalence ratio of 1:1.05 to 1.09, wherein the second positive electrode active material precursor and the lithium-containing raw material are mixed in an equivalence ratio of 1:1.01 to 1.05, wherein the equivalence ratio of the first positive electrode active material precursor and the lithium-containing raw material and the equivalence ratio of the second positive electrode active material precursor and the lithium-containing raw material are different.

2. The method of claim 1, wherein the pre-sintering of the mixture to obtain the first pre-sintered product and the pre-sintering of the mixture to obtain the second pre-sintered product are performed for 3 hours to 24 hours.

3. The method of claim 1, wherein the disintegrated first pre-sintered product and the disintegrated second pre-sintered product are mixed in a weight ratio of 0.5 to 0.9:0.5 to −0.1.

4. The method of claim 1, wherein the main-sintering is performed in the constant temperature for 3 hours to 24 hours.

5. The method of claim 1, further comprising a washing process after the positive electrode material is obtained.

6. The method of claim 1, wherein the first positive electrode active material precursor and the second positive electrode active material precursor are each independently represented by Formula 1:

$$Ni_xCo_yM^1_{(1-x-y)}(OH)_2 \quad \text{[Formula 1]}$$

wherein, $M^1$ is at least one selected from the group consisting of manganese (Mn) or aluminum (Al), $0.6 \leq x < 1.0$, $0 < y \leq 0.4$, and $0.6 < x+y \leq 1.0$.

* * * * *